United States Patent
Pekris et al.

(10) Patent No.: US 9,039,014 B2
(45) Date of Patent: May 26, 2015

(54) SEAL

(75) Inventors: Michael J Pekris, Derby (GB); Gervas Franceschini, Derby (GB); Terence V Jones, Oxford (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 13/431,404

(22) Filed: Mar. 27, 2012

(65) Prior Publication Data
US 2012/0248709 A1    Oct. 4, 2012

(30) Foreign Application Priority Data
Apr. 4, 2011 (GB) .................................. 1105625.6

(51) Int. Cl.
*F16J 15/40* (2006.01)

(52) U.S. Cl.
CPC ...................................... *F16J 15/406* (2013.01)

(58) Field of Classification Search
CPC .............................. F16J 15/406; F16J 15/3288
USPC .......................... 277/355, 409, 411, 412, 421
See application file for complete search history.

(56) References Cited

U.S. PATENT DOCUMENTS

| | | | |
|---|---|---|---|
| 3,917,150 A | 11/1975 | Ferguson et al. | |
| 5,799,952 A * | 9/1998 | Morrison et al. | 277/355 |
| 6,173,962 B1 * | 1/2001 | Morrison et al. | 277/355 |
| 6,267,381 B1 | 7/2001 | Wright | |
| 6,343,792 B1 | 2/2002 | Shinohara et al. | |
| 7,780,399 B1 * | 8/2010 | Garrison | 415/1 |
| 2005/0206087 A1 * | 9/2005 | Hogg et al. | 277/355 |
| 2009/0297341 A1 | 12/2009 | Turnquist et al. | |

FOREIGN PATENT DOCUMENTS

| | | |
|---|---|---|
| DE | 10 2009 025 835 A1 | 12/2009 |
| EP | 1 229 275 A1 | 8/2002 |
| EP | 1 388 695 A2 | 2/2004 |
| WO | WO 2004/088180 A2 | 10/2004 |
| WO | WO 2012/052740 A1 | 4/2012 |

OTHER PUBLICATIONS

Aug. 8, 2012 Search Report issued in European Patent Application No. EP 12 16 1424.
Jul. 29, 2011 Search Report issued in British Patent Application No. GB1105625.6.

* cited by examiner

*Primary Examiner* — Gilbert Lee
(74) *Attorney, Agent, or Firm* — Oliff PLC

(57) ABSTRACT

A seal for sealing between two component parts permits a leakage flow of fluid from an upstream side of the seal to a downstream side of the seal. The seal has a jet-producing formation which produces one or more fluid jets that impinge on and thereby restrict the leakage flow.

13 Claims, 5 Drawing Sheets

SEAL

FIELD OF THE INVENTION

The present invention relates to a seal for sealing between two components.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the is intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

It is frequently necessary to effect a seal in a clearance gap between two components that are capable of relative movement. In particular seals are often required to seal between a rotatable shaft and a housing surrounding the shaft, the housing having a bore through which the shaft extends.

Within a gas turbine engine, the interconnecting shafts (ie which extend between the fan 12 or a compressor 13, 14 and the respective turbine 18, 17, 16) rotate at relatively high speeds and are exposed to pressurised hot gases. Seals are required for these shafts and the seal performance can have a significant effect on the overall efficiency of the gas turbine engine. There are a number of seal designs that have been proposed for such purposes and that are designed to operate within the harsh environment found within a gas turbine engine.

For example, U.S. Pat. No. 3,917,150 proposes a brush seal, which is a seal for concentric shafts and comprises a pack of flexible wires or bristles supported by a solid backing ring. The bristles contact the rotating shaft, and provide a restriction to the axial fluid flow along the shafts. The bristles are inclined to the radial direction so as to deflect under any shaft movement, forming a compliant seal. The bristles tend to blow down onto the rotor, further reducing leakage.

U.S. Pat. Nos. 6,267,381 and 6,343,792 propose leaf seals, which are also for sealing concentric shafts. The leaf seal comprises a stack of sheet like elements which are inclined to the radial direction, and offer a compliant seal with higher axial rigidity. Unlike the brush seal, the leaf pack may be enclosed by cover plates at the upstream and downstream sides of the seal. The cover plates can be used to control the pressure distribution in the pack, and hence leaf blow-down or lift-up.

In general, there is a demand for robust seal designs with low leakage characteristics to reduce specific fuel consumption in gas turbines. In respect of rotating shafts, this typically means running annular seals in close proximity to (and often in contact with) the shaft, resulting in high wear and frictional heat generation, with adverse consequences for part life and engine efficiency.

High leakages and hence performance penalties are also often associated with linear or slot geometries at various interfaces in the engine, including between surfaces which are not relatively rotating.

Reducing leakages at both rotary and non-rotary sealing locations can contribute to reduced specific fuel consumption.

SUMMARY OF THE INVENTION

Accordingly, the present invention provides a seal for sealing between two component parts, the seal permitting a leakage flow of fluid from an upstream side of the seal to a downstream side of the seal, wherein the seal has a jet-producing formation which produces one or more fluid jets that impinge on and thereby restrict the leakage flow.

Depending on the configuration of the jet-producing formation, the fluid jet(s) can restrict the leakage flow in a number of ways e.g. by reducing the effective area for the flow and/or by reducing the velocity of the flow. Advantageously, although fluid is used to produce the jet(s), the overall flow coming from the downstream side of the seal (i.e. the restricted leakage flow plus the flow from the jet(s)) can be less than the unrestricted leakage flow would be in the absence of the jet(s). Thus, by adopting the seal, performance benefits can be obtained. Alternatively, running proximities in the seal can be increased, with benefits to part life, without increasing the overall flow coming from the downstream side of the seal.

The seal may have any one or, to the extent that they are compatible, any combination of the following optional features.

Preferably, the jet-producing formation produces a plurality of fluid jets.

Typically, the leakage flow is a gas flow, such as an air flow. Typically, the fluid jet(s) are gas jets, such as air jets.

Preferably, the or each fluid jet impinges on the leakage flow at the downstream side of the seal. That is, the jet preferably acts on the leakage flow as it exits the seal, and in this way can conveniently reduce the leakage flow through the seal.

The jet-producing formation may be configured such that at least a component of the direction of the or each impinging fluid jet is opposite to the direction of the leakage flow. Such an arrangement can encourage the jet to locally dissipate the kinetic energy of the leakage flow. This can locally increase the pressure of the leakage flow, reducing the pressure differential across the seal and thereby reducing the net flow through the seal. For example, when the leakage flow is along an axis of the components, the direction of the fluid jet may be angled to have an axial component opposing the leakage flow.

Additionally or alternatively, the jet-producing formation may be configured such that at least a component of the direction of the or each impinging fluid jet is perpendicular to the direction of the leakage flow. Such an arrangement can reduce the effective flow is area for the leakage flow, and thereby also reduce the net flow through the seal.

The seal may be a rotary seal, the two components being coaxial with and rotating relative to each other. In a rotary seal, one of the components may be rotationally static with the other component rotating (eg a "shaft seal" between a static outer housing and a rotating shaft). Alternatively, both components may rotate, but at different rotational velocities and/or in different rotational directions (eg an "inter-shaft" seal between two co-rotating or counter-rotating shafts). The leakage flow is often along the axial direction at the point of impingement of the jets.

The or each jet-producing formation may be configured such that the impinging fluid jet induces swirl in the leakage flow around an axis (eg the rotation axis in the case of a rotary seal) of the components. For example, the direction of the fluid jet may be angled to have a circumferential component. Increasing the swirl component in the leakage flow can also reduce the net flow through the seal.

When the jet-producing formation produces a plurality of fluid jets, these are generally circumferentially spaced around the seal. In this way the benefit of the fluid jets can be obtained at all circumferential positions. However, additionally or alternatively, the fluid jets may be axially spaced along the seal, for example, in separate circumferentially extending rows.

Conveniently, the seal may further have a by-pass formation which accepts fluid from the upstream side of the seal and delivers the accepted fluid to the jet-producing formation.

Alternatively, however, the seal may further have an external fluid formation which accepts fluid from an external source and delivers the accepted fluid to the jet-producing formation. Such an arrangement may be adopted when the fluid at the upstream side of the seal has insufficient pressure to form the jet(s).

The seal may be a labyrinth seal, brush seal, leaf seal, air-riding seal, finger seal, carbon seal, or e.g. another compliant type of seal. Thus the seal can have the jet-producing formation in addition to the basic structure of the seal.

Typically, the jet-producing formation is formed as a fluid exit hole or holes in a component of the seal. Conveniently, the component can be a backing plate of the seal. The or each exit hole can have a circular or non-circular (eg elliptical, square-shaped or rectangular-shaped) cross-section.

The seal may be for sealing between two component parts of a gas turbine engine. For example, the seal may be for sealing between a rotatable shaft, such a fan-to-turbine or compressor-to-turbine interconnecting shaft, and a housing.

BRIEF DESCRIPTION OF THE DRAWINGS

Embodiments of the invention will now be described by way of example with reference to the accompanying drawings in which.

DETAILED DESCRIPTION

Figure 1:
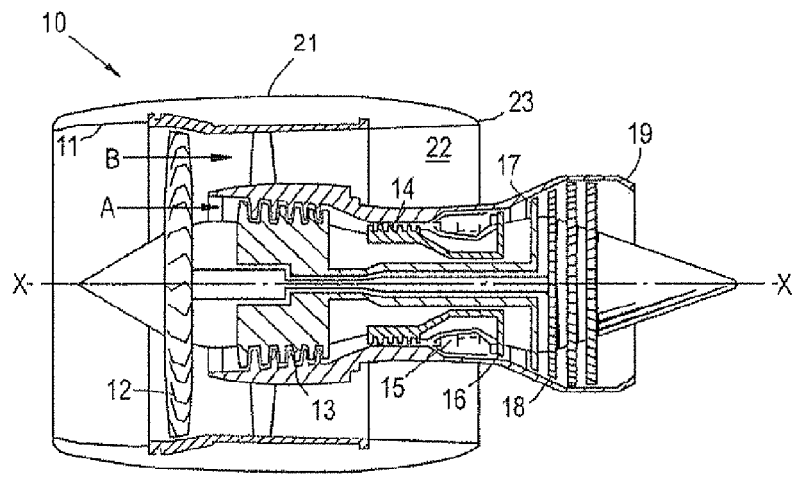
FIG. 1 shows a longitudinal cross-section through a ducted fan gas turbine engine.
Figure 2:
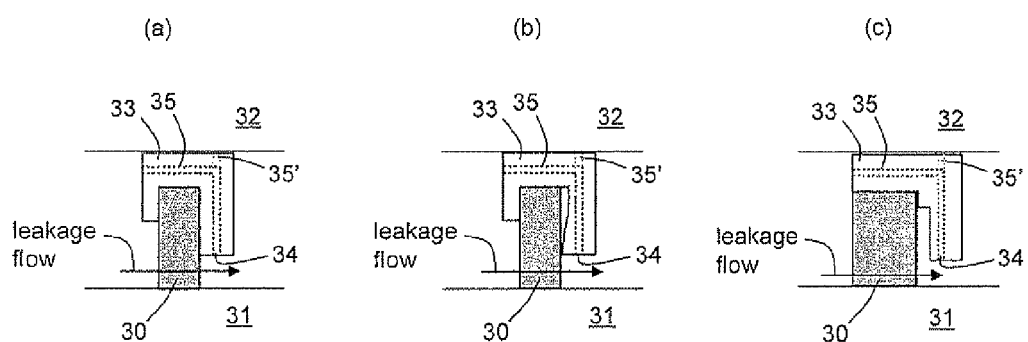
FIG. 2 shows schematic longitudinal cross-sections (a) to (c) through respective rotary seals.

FIGS. 2(a) to (c) show schematic longitudinal cross-sections through respective rotary seals. Each seal has a seal element 30 (such as a ring-shaped brush, a leaf stack, a labyrinth seal, an air-riding seal, a carbon ring or other coaxial type of seal) which is positioned between an inner rotating shaft 31 and a seal housing 32. Each seal further has a backing plate or clamping ring 33. The leakage fluid flow (which is typically an air flow) from the upstream side of the seal to the downstream side of the seal is indicated.

A plurality of circumferentially spaced holes 34 in the backing plate or clamping ring 33 provides a jet-producing formation at the downstream side of the seal. More particularly, respective fluid jets (eg air jets) exit the holes and impinge on the leakage fluid flow leaving the seal element 30. The holes can be fed fluid via a by-pass formation comprising respective feed passages 35 which extend through the backing plate or clamping ring to accept fluid from the upstream side of the seal. Alternatively, the holes can be fed fluid via an external fluid formation comprising respective feed passages 35' which extend through the backing plate or clamping ring to accept fluid from an external source of fluid. The external fluid formation can be beneficial in lower pressure applications, where the jet kinetic energy may be insufficient, or where choked flow in the feed passages may not be achieved with the by-pass formation.

The fluid jets exiting from the holes 34 reduce the leakage flow by various mechanisms which are illustrated with reference to FIGS. 3(a) to (c). The relative of importance of the mechanisms can depend particularly on the incident angle of the impinging jets relative to the direction of the leakage flow.

Figure 3:
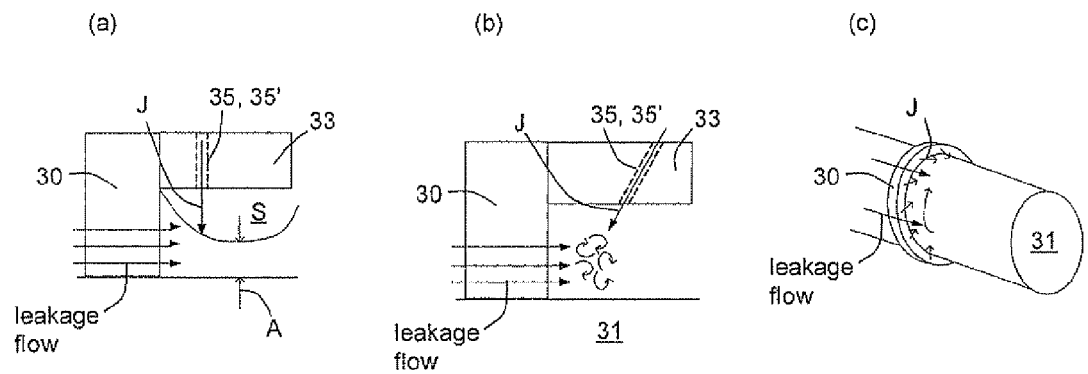
FIG. 3 illustrates respective mechanisms (a) to (c) for reducing seal leakage flow.

FIG. 3(a) shows a schematic longitudinal cross-section through a rotary seal, such as a seal of FIGS. 2(a) to (c). By directing the impinging jets J such that a component of the direction of each jet is perpendicular to the direction of the leakage flow exiting from the seal element 30, the effective flow area A for leakage flow A can be reduced by forming a region S in which flow is separated from the backing plate or clamping ring 33. This reduced flow area decreases the net leakage flow through the seal.

FIG. 3(b) shows another schematic longitudinal cross-section through a rotary seal, such as a seal of FIGS. 2(a) to (c). In this case, the impinging jets J are angled such that a component of the direction of each jet is opposite to the direction of the leakage flow exiting from the seal element 30. This causes the leakage flow to dissipate kinetic energy, raising the back pressure on the seal and reducing the leakage flow. A further advantage of the dissipated kinetic energy is that, provided that jet penetration and mixing of the leakage and jet flows are adequate, heat transfer with the wall of the shaft 31 and the seal element 30 can be increased, which can lead to beneficial local cooling of the shaft and the seal.

FIG. 3(c) shows a schematic view of the seal element 30 on the shaft 31. In this case, the impinging jets J are angled to induce swirl in the leakage flow around the axis of the shaft. This can also reduce the net flow through the seal.

Figure 4:
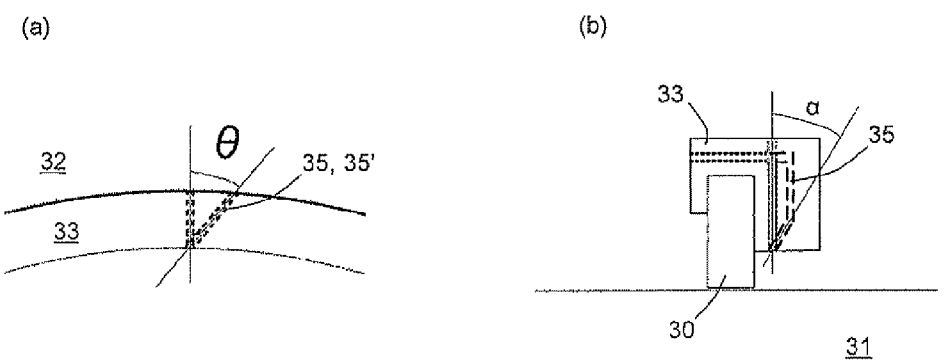
FIG. 4 shows (a) a view along the axis of a seal to illustrate the jet swirl angle θ, and (b) a longitudinal cross-section through a seal to illustrate the jet inclination angle α.

FIG. 4(a) is a view along the axis of the seal and shows schematically the jet swirl angle θ which induce swirl in the leakage flow, and FIG. 4(b) is a longitudinal cross-section through the seal and shows schematically the inclination angle α. A higher value for a increases the component of the direction of the jet which is opposite to the direction of the leakage flow and decreases a component of the direction of the jet which is perpendicular to the direction of the leakage flow. θ and α can be set at different values around the circumference of the seal to match departures from circular symmetry in the seal or the component parts sealed by the seal. Also the circumferential spacing between jets can be varied.

In a linear or slot seal similar considerations apply, and the impinging jet or jets can be inclined away from the plane and the direction of the leakage flow. Likewise, the spacing between jets and the angles of the jets at different positions can be varied.

Returning to the rotary seal, various configurations for the feed passages 35, 35' through the backing plate or clamping ring 33 are possible, as illustrated in FIGS. 5(a) to (f). The configurations can provide different θ and α angles, positions for the holes 34, face angles f, axial and circumferential jet spacings, and distances r between the backing plate or clamping ring and the shaft 31. FIG. 5(c) shows a backing plate or clamping ring 33 with an additional lip 36 which provides a further row of jets. Multiple rows of jets are also shown in FIG. 5(b) and (d) to (f).

By varying f, the angle of the face 37 in which the jet holes 34 are formed, as in FIGS. 5(a) to (c) and (f), the hole aspect ratio can be varied from circular to elliptical for a given angle α. It is also possible to provide inclined faces having an angle f which varies with position. Non-circular, eg square-shaped or rectangular-shaped, holes can be adopted. FIG. 6 shows respective plan views of the faces in which the holes 34 are formed of six backing plate or clamping rings 33. The holes may be in single or multiple rows.

Figure 5:
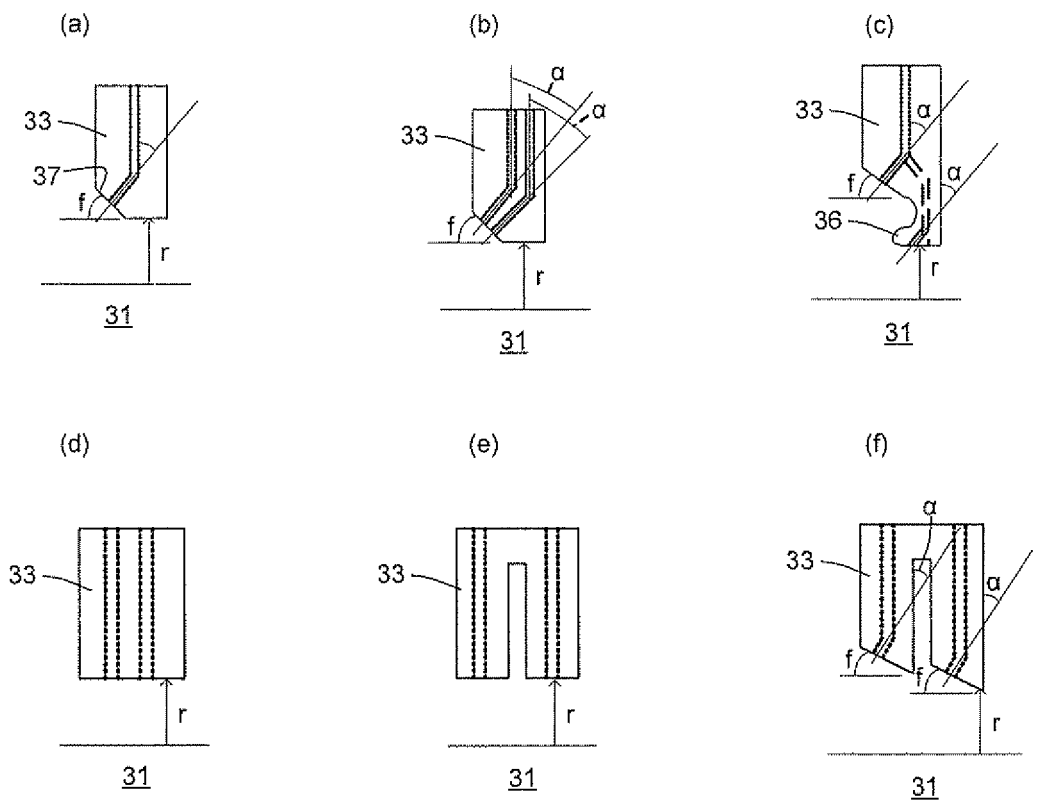
FIG. 5 shows schematic longitudinal cross-sections (a) to (f) through the backing plate or clamping ring of respective rotary seals.
Figure 6:
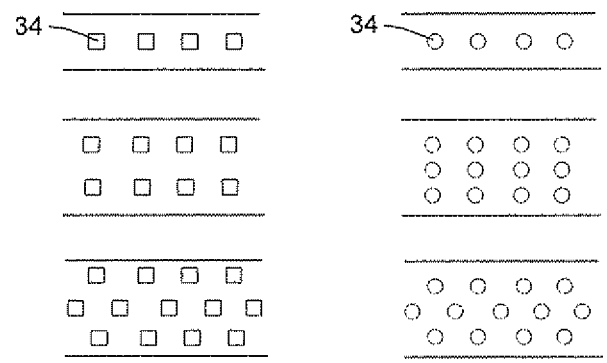
FIG. 6 shows respective plan views of inner faces of six backing plate or clamping rings, jet-forming holes being formed in the faces.

In FIGS. 5 (b), (c) and (f) the rows of jets all have the same angle α. However, another option is for different rows to have different angles α.

Figure 7:
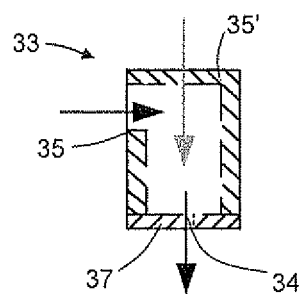
FIG. 7 shows a schematic longitudinal cross-section through the backing plate or clamping ring of a further rotary seal.

It is preferable that losses are low inside the feed passages 35, 35'. Thus one option is to provide a large feed passage cross-section, and to create the jet hole 34 by attaching a drilled plate to form the face 37, as shown in FIG. 7. Machining or forming the walls of the feed passages to conform better to the streamlines of the flow can further reduce losses.

Figure 8:
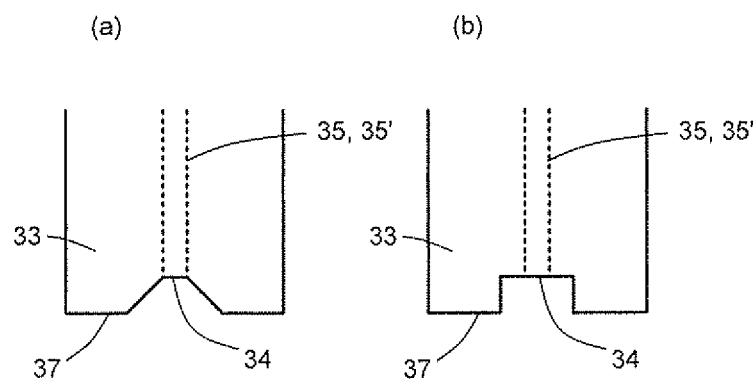
FIG. 8 shows two possible profiles (a) and (b) around a jet hole.

The profile of the face 37 around jet hole 34 can also be varied, e.g. to provide better coverage and to reduce losses. Possible inset profiles are shown in FIGS. 8(a) and (b). However, another possibility (not illustrated) is for the face around the jet hole to have a protruding rather than an inset profile.

The concept of using a fluid jet or jets to reduce a leakage flow can be applied more generally to reduce leakage from annular or linear slots or orifices. FIGS. 9(a) to (d) show schematic cross-sections to further illustrate the concept.

Figure 9:
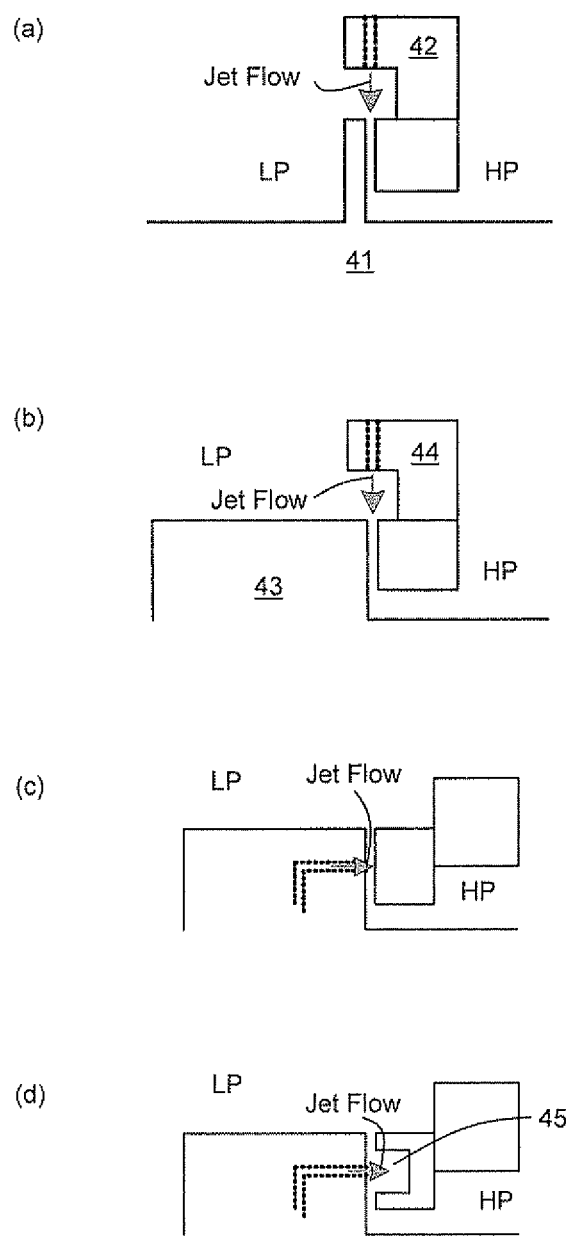
FIG. 9 (a) to (d) shows schematic longitudinal cross-sections (a) to (d) though annular or linear slots having impingement jets to reduce leakage flows.

In FIG. 9(a), a jet flow is used to reduce leakage from the high pressure (HP) to the low pressure (LP) side of an annular slot 40 between a rotor 41 and a stator 42. In this case the jet flow, ignoring any component of flow out of the plane of the figure, directly opposes the direction of the leakage flow to dissipate the leakage flow kinetic energy.

FIG. 9(b) shows a similar arrangement as FIG. 9(a), but in this case the slot is between two stationary component parts 43, 44. Further, the slot may be linear rather than annular.

Likewise, FIGS. 9(c) and (d) show arrangements that may be applied to slots formed between stationary components parts, or component parts that move relative to each other. In the case of FIG. 9(c), however, the jet flow (again ignoring any component of flow out of the planes of the figures) is perpendicular to the direction of the leakage flow and primarily serves to constrict the effective area for the leakage flow. In the case of FIG. 9(d), the leakage flow passes through a chamber 45 which expands the leakage flow at the position of impingement by the jet flow. This encourages mixing of the two flows and dissipation of kinetic energy.

In FIGS. 9(a) to (d) the direction of the jet flow may be angled away from the direction illustrated, e.g. as discussed above in relation to FIGS. 4(a) and (b).

The sealing concept can advantageously be used in conjunction with existing advanced seals, to reduce the need for high interference or strong blow down seal designs which can lead to high wear and heat generation. Impingement cooling and/or increased turbulence in the region of the rotor surface caused by the jet or jets can also promote cooling, and can therefore lead to safer rotor-seal operation. In some cases, the use of jets to reduce the leakage flow can allow contacting seals to be replaced by non-contacting (eg labyrinth) seals.

The approach can also be applied in oil-sealing applications, where consistently low levels of leakage are critical to overall engine performance and maintenance costs.

A variety of configurations are described above, which can each be optimised to give an effective sealing configuration for a given application. These optimisation variables include: jet geometry (eg orientation, hole size, hole shape), number of jets, jet arrangement and spacing, backing/clamping ring geometry, source of the fluid for the jets, feed passage geometry, and hole profile.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A seal for sealing between two component parts, the seal permitting a leakage flow of fluid from an upstream side of the seal to a downstream side of the seal, the seal comprising:
   a jet-producing formation which produces one or more fluid jets at a most downstream side of the seal that impinge on and thereby restrict the leakage flow as the flow exits the seal, wherein
   the jet producing formation is formed as a fluid exit hole or holes disposed in a component of the seal,
   the component of the seal is a backing plate, a cover plate or a clamping ring, and
   the backing plate, the cover plate or the clamping ring includes at least one fluid exit hole disposed in a substantially axial and radial direction relative to the flow of the fluid.

2. A seal according to claim 1, wherein the jet-producing formation is configured such that at least a component of the direction of the or each impinging fluid jet is opposite to the direction of the leakage flow.

3. A seal according claim 1, wherein the jet-producing formation is configured such that at least a component of the direction of the or each impinging fluid jet is perpendicular to the direction of the leakage flow.

4. A seal according to claim 1, wherein the seal is a rotary seal, the two component parts being coaxial with and rotating relative to each other.

5. A seal according to claim 4, wherein one of the components is rotationally static and the other component rotates.

6. A seal according to claim 4, wherein both the components rotate.

7. A seal according to claim 4, wherein the jet-producing formation is configured such that the or each impinging fluid jet induces a swirl component in the leakage flow around the axis of rotation.

8. A seal according to claim 4, wherein a plurality of fluid jets are circumferentially spaced around the seal.

9. A seal according to claim 4, wherein a plurality of fluid jets are axially spaced along the seal.

10. A seal according to claim 1 further comprising:
a by-pass formation which accepts fluid from the upstream side of the seal and delivers the accepted fluid to the jet-producing formation.

11. A seal according to claim 1 further comprising:
an external fluid formation which accepts fluid from an external source and delivers the accepted fluid to the jet-producing formation.

12. A seal according to claim 1, wherein the seal is a labyrinth seal, brush seal, leaf seal, air-riding seal, finger seal, or carbon seal.

13. A seal according to claim 1, wherein the seal is disposed between two component parts of a gas turbine for sealing the two component parts.

* * * * *